350-385 SR
OR 3,601,468
09 N WP 6
X 4021Y
X 4035Y X 4036C

[11] 3,601,468

[72] Inventor John L. Dailey
Pittsford, N.Y.
[21] Appl. No. 877,241
[22] Filed Nov. 17, 1969
[45] Patented Aug. 24, 1971
[73] Assignee Zerox Corporation
Rochester, N.Y.

[54] OPTICAL LIGHT WAVE MODULATOR FOR REPRESENTING A FIRST COLOR LIGHT WAVE AS A SECOND COLOR LIGHT WAVE
1 Claim, 3 Drawing Figs.

[52] U.S. Cl. .......... 350/150, 250/83.3 R, 250/213 R
[51] Int. Cl. .......... G02f 1/26
[50] Field of Search .......... 350/150, 157; 250/213 R, 213 VT, 83.3 HR, 83.3 HP

[56] References Cited
UNITED STATES PATENTS

| | | | |
|---|---|---|---|
| 3,239,671 | 3/1966 | Byhrer .......... | 350/150 |
| 3,346,319 | 10/1967 | Billings .......... | 350/150 |
| 3,449,583 | 6/1969 | Eden .......... | 350/150 |
| 3,502,875 | 3/1970 | Ploss et al. .......... | 350/150 |

*Primary Examiner*—David Schonberg
*Assistant Examiner*—Ronald J. Stern
*Attorneys*—James J. Ralabate, Donald F. Daley, Marn and Jangarathis and Thomas J. Wall

ABSTRACT: A photoconductor light wave modulator embodying a photoconductor and a crystal of potassium dihydrogen phosphate, and activated by a first color light wave of varying intensity and a second color light wave of fixed intensity to represent the first color light waves of varying intensity in terms of the second light wave of corresponding varying intensity.

INVENTOR.
John L. Dailey
BY
Marn & Jangarathis
ATTORNEYS

OPTICAL LIGHT WAVE MODULATOR FOR REPRESENTING A FIRST COLOR LIGHT WAVE AS A SECOND COLOR LIGHT WAVE

This invention relates to color wave-translating apparatus, and more specifically to such apparatus embodying a light wave modulator for translating a first color light wave of varying intensity into a second color light wave of corresponding varying intensity.

It happens frequently that an object presents one or more colors in a spectral distribution unsuitable for use in a particular apparatus. This necessitates a translation of each of such unsuitable colors into another color expeditiously usable in the particular apparatus. This may mean, for example, that an image in red light may be translated into an image in blue light, or an image in X-ray or infrared may be translated into an image in visible light, or a chromatic image may be translated into achromatic form. Furthermore, this may mean the reproduction of red symbols on a black background, or vice versa, or the separation of three different colors into three suitable color representations for use in the particular color reproduction above-mentioned.

The present invention concerns an improved color translation modulator capable of expeditious translation of one color image into a different color image, or into an achromatic image, or the separation of each color from a plurality of different colors.

A principal object of the invention is to provide improved translation from one color to another color.

Another object is to translate a given chromatic image into a different chromatic image.

A further object is to translate a given chromatic image into an achromatic image.

An additional object is to translate an achromatic image into a preselected chromatic image.

Still another object is to separate each color from the others in a multicolor image.

A specific embodiment of a photoconductor light wave modulator according to the invention comprises a source of first preselected color light waves of varying intensity, a supply of second preselected color light waves of fixed intensity, a light wave modulator including a photoconductor and a predetermined crystal, a mirror reflecting the second light waves, a birefringent collimating lens transmitting in one direction the mirror reflected waves at an angle slightly less than normal incidence, a birefringent circular polarizer means transmitting the mirror reflected light waves in the one direction in circular polarized form at the angle slightly less than normal incidence to a front surface of the modulator crystal; whereby the photoconductor is initially energized to activate a back surface of the modulator crystal to shift the phase of the latter reflected second light waves through 180° as the latter waves are reflected from the modulator crystal back surface in the circular polarized form at the angle slightly less than normal incidence to block the transmission of the latter waves through the modulator crystal front surface and the photoconductor is further energized by the first color waves of varying intensity to additionally activate the modulator crystal back surface to shift the phase of the second light waves to an amount less than 180° in correspondence with the varying intensity of the first color waves to transmit the second color light waves through the modulator front surface with an intensity varying in correspondence with the varying intensity of the first color light waves.

The birefringent circular polarizer means receiving the reflected second light waves of varying intensity in circular polarized form at the angle slightly less than normal incidence as transmitted through the modulator crystal front surface in a direction opposite to the one direction removes the circular polarized form from the latter light waves. The birefringent collimating lens receiving the reflected second light waves at the angle slightly less than normal incidence in the opposite direction from the birefringent circular polarizer means focuses the latter waves onto a point spaced from the reflecting mirror. A further lens optically coupled to the collimating lens receives the reflected second waves of varying intensity in the opposite direction from the collimating lens via the spaced focusing point; and a load utilizes the reflected second light waves of varying intensity received from the further lens as representative of the first light waves of varying intensity.

The invention is readily understood from the following description taken together with the accompanying drawing in which.

Figure 1:
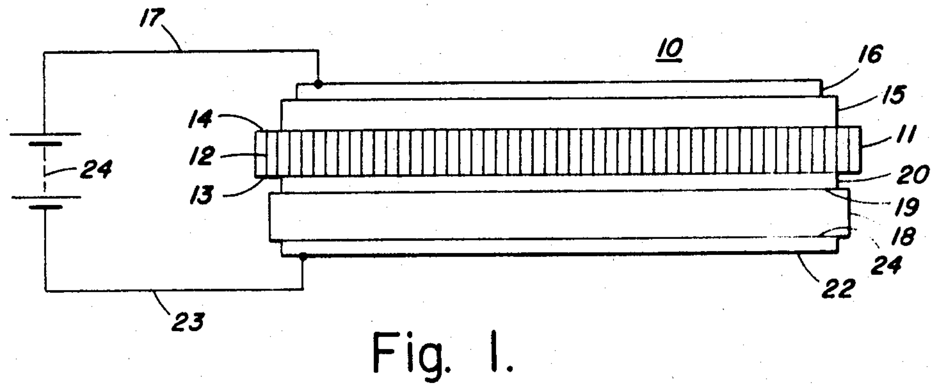
FIG. 1 is a side elevational view of a specific embodiment of the invention.

FIG. 1 shows a photoconductor light wave modulator 10 formed in a unitary structure in accordance with one embodiment of the invention and comprising a multielectric lead glass plate 11 available in the commercial market and including, for example, a plurality of electric leads 12 uniformly spaced in parallel between front and back surfaces 13 and 14, respectively. In one form, the plate 11 is supplied with the electric leads spaced in parallel in the order of 526 by 526 leads per square inch. The plate comprises opaque glass constituting an anisotropic conductor which is conductive in the direction of the electric leads and nonconductive in the orthogonal direction.

After the front surface 14 of plate 11 is polished to insure a flat surface, a photoconductor 15 consisting of, for example, selenium, zinc oxide or cadmium sulfide or the like is evaporated onto the latter polished flat front surface to a thickness to withstand a voltage drop of the order of 5 kilovolts. Then, gold 16 transparent to light waves of a first preselected color for a purpose later explained is evaporated onto the exposed surface of the photoconductor previously evaporated onto the plate front surface 14. This gold serves as an electric electrode to which an electric lead 17 is conductively attached.

A KDP crystal 18 of potassium dihydrogen phosphate with its surfaces normal to its crystallographic Z axis is polished on its back surface 19 to optical flatness. Onto this surface there is evaporated a dielectric mirror 20 which is reflective, for example, at green and blue wavelengths. This mirror comprises evaporated silver laid down through a screen so that the final surface includes small, discrete squares of silver. The silver mirror is then affixed to the back surface 13 of the glass panel 11 with a suitable, nonconductive cement. Thereafter, the front surface 21 of the crystal is polished to a thickness of the order of 10 mils, and then, gold 22 transparent to light waves of a second preselected color is evaporated on the latter surface for a purpose subsequently explained. This forms an electric electrode to which an electric lead 23 is conductively secured. The several plates thus far described are finally bound into a unitary structure via a suitable mechanical clamp, not shown. A battery 24 is connected to the leads 17 and 22 for a purpose hereinafter mentioned.

Figure 2:
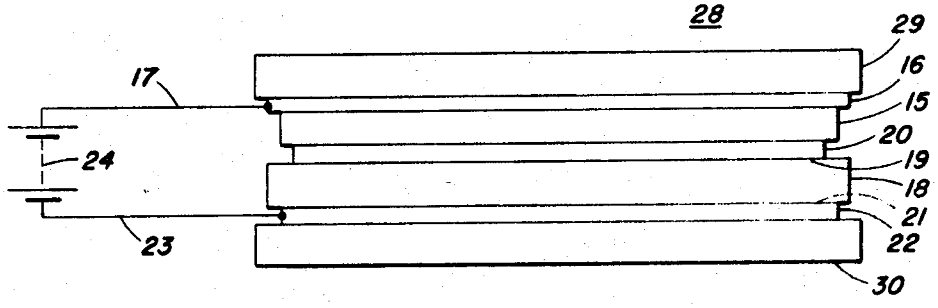
FIG. 2 is a side elevational view of an alternate embodiment of the invention.

FIG. 2 illustrates a photoconductor light wave modulator 28 formed into a unitary structure in accordance with an alternate embodiment of the invention which is essentially similar to the modulator 11 in FIG. 1 except the former omits the multielectric lead plate 11. The crystal 18 in FIG. 2 has its front surface 21 suitably polished, and then the gold 22 evaporated onto the latter surface. This constitutes the electrode to which the lead 23 is attached. The back surface 19 of the crystal 18 is ground to a desired thinness and thereafter the dielectric mirror 20 is evaporated thereon. The photoconductor 15 is evaporated onto an optically flat glass plate, and the exposed surface of the photoconductor polished to optical flatness is mounted on the dielectric mirror 20. Then, the gold electrode 16 is evaporated onto the photoconductor 15 and joined to the lead 17. The battery is connected to the leads 17 and 23. Clear glass plates 29 and 30 are positioned on the exposed surfaces of the glass electrodes, and the several plates as thus described are bound into a unitary structure via a suitable mechanical clamp, now shown.

Figure 3:
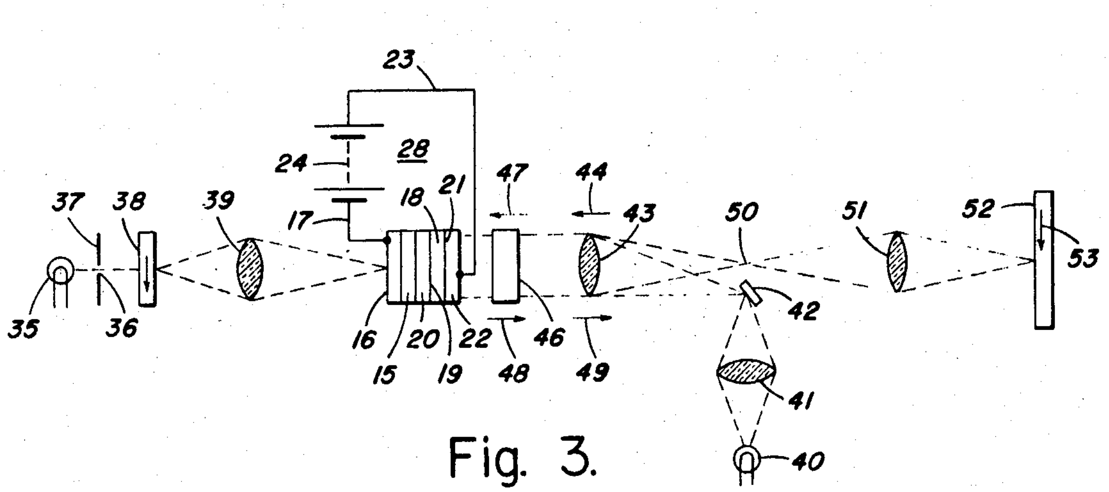
FIG. 3 is a schematic circuit including either FIG. 1 or FIG. 2 at a given time.

FIG. 3 is an optical system for utilizing either the photoconductor light modulator 10 or 28. For the purpose of this explanation, it is assumed that modulator 28 is connected in FIG. 3. This figure also shows a lamp 35 applying its light via a slit 36 in a fixed opaque element 37 for exposing a corresponding area of a transparent object 38 having a pattern, not shown, of the first preselected color previously mentioned with regard to FIGS. 1 and 2. This pattern may comprise, for example, a single numeral or a single letter of the alphabet or the like in a red color on a colorless background. For the purpose of this description, the first preselected color is assumed to be red color light waves. It is understood that the object 38 is movable in the direction of the arrow at a constant, predetermined speed by a suitable mechanism, not shown, operating in a conventional manner.

A lens 39 focuses the illuminated exposed slit of the object through the electrode 16 onto the photoconductor 15 at the back of a central portion of the light modulator 28. A source 40 of the second preselected light color, which is blue light waves for the purpose of this description, is focused via a lens 41 onto a mirror 42 disposed at an angle of 45° for a purpose later identified. This mirror reflects the blue light at an angle slightly less than normal incidence onto a birefringent collimating lens 43 in the one direction from the right hand to the left hand as shown by arrow 44.

The blue light from the collimating lens is transmitted to a circular polarizer 46 in the one direction indicated by arrow 47, wherein the refracted blue light at the angle slightly less than normal incidence is changed into a circular polarized form. This light is transmitted in the one direction through the electrode 22 and the front and back surfaces 21 and 19 of the crystal 18 onto the dielectric mirror 20 which reflects the circular polarized light back through the latter crystal in a direction opposite to the one direction. As such reflected circular polarized light is provided with a 180° phase shift in a manner hereinafter explained, it is obvious that the 180° out-of-phase blue light waves transmitted in the one and opposite directions are cancelled in the crystal, whereby the circular polarized blue light waves at the angle slightly less than normal incidence as reflected from the dielectric mirror 20 are not transmitted through the crystal front surface 21 in the opposite direction.

As the phase of the circular polarized blue light waves at the angle slightly less than normal incidence is assumed to vary different amounts less than 180° for a reason subsequently explained, it is apparent that correspondingly varying amounts of the latter reflected blue light waves are transmitted in the opposite direction through the front surface 21 of the crystal. These reflected blue light waves varying in intensity are then passed through the circular polarizer 46 in the opposite direction indicated by arrow 48, wherein the circular polarization is removed from the latter reflected waves.

Thereafter, the reflected blue light waves devoid of the circular polarized form but still at the angle slightly less than normal incidence are passed from the circular polarizer 46 onto the collimating lens 43 in the opposite direction as shown by arrow 49. This lens focuses the oppositely reflected blue light waves onto a point 50 which is spaced from the mirror 42, thereby precluding interference therebetween. This focusing of the reflected blue light waves is occasioned by the angle slightly less than normal incidence introduced by the mirror 42 into the initial blue light waves as reflected therefrom onto the collimating lens 42 in the one direction.

Lens 51 optically coupled via the spaced point 50 focuses the last-mentioned oppositely reflected blue light waves varying in intensity onto a load member 52 moving in the direction indicated by arrow 53 in synchronism with the movement of the object 38. It is seen that the intensity of the blue light of source 40 varies in correspondence with the varying intensity of the red light as exposed at the object 38. It is thus apparent that the blue light of varying intensity represents the red light of varying intensity at the load member. In other words, the red light waves of varying intensity derived from the object 38 are translated via the modulator 28 into blue light waves of varying intensity for use by the load member. It is understood that while the object 38 and load member are shown in linear forms, it is possible that either one or both of them may be provided with a curvilinear form. It is also understood that the load member includes a specially prepared surface such as, for example, a xerographic type to receive the blue light waves of varying intensity for a particular color light reproduction process.

A further explanation of the operation of FIG. 3 is as follows. In the dark, the resistivity of the photoconductor is about $10^{15}$ ohms per square centimeter while that of the crystal is somewhat less than $10^{12}$ ohms per square centimeter. As the photoconductor is thicker than the crystal, a direct voltage of the source 24 applied to the gold electrodes of the modulator divides in a ratio of more than 1,000 to 1. Let it be assumed that the applied voltage is 3 kilovolts. Now, the red light waves of varying intensity originating in the object 38 strike the photoconductor to generate hole-electron pairs therein. If the photoconductor were an *n* type, the voltage effective on the photoconductor electrode is negative and the electric field set up in the photoconductor separates the holes from the electrons as rapidly as they are generated, pulling the holes into the one photoconductor electrode, wherein the holes vanish. Now, the electrons are drawn by the electric field toward the opposite photoconductor electrode.

When the electrons have drifted as far as the interface between the photoconductor and the back surface 19 of the crystal, i.e., at the photoconductor side of the crystal back surface 19, the electrons have reached a barrier as the crystal is effectively an insulator. The electrons continue to pile up at the interface until the quantity of the electrons is adequate to cancel the electric field. This occurs when the voltage drop between the crystal back surface and the interface is equal to the battery voltage. This voltage thus rises from 3 volts to 3,000 volts.

The electro-optic characteristic of the crystal (and its isomorphs) is such that when a voltage is applied to its Z axis, as in the instant case, the birefringence along the Z axis, normally zero, rises to significant values. When the blue light waves in the circular polarized form at the angle slightly less than normal incidence are transmitted through the front surface 21 of the crystal and reflected off the back surface 19 thereof, the birefringence along the Z axis is sufficient to induce the above-noted 180° phase shift in the last-mentioned blue light waves reflected from the crystal back surface 19. That is to say, a 180° phase shift is induced into the blue light waves in the circular polarized form at the angle slightly less than normal incidence in their round trip in the crystal when the voltage across the latter crystal is about 3,700 volts. As a consequence of a 3,000-volt voltage drop across a particular point of the crystal, such point is approximately 100 percent reflective to the blue light waves thereat. In view of the 180° phase shift and the 100 percent reflectivity at the crystal back surface 19, the blue light waves in circular, polarized form at the angle slightly less than normal incidence passing between the front and back surfaces 21 and 19, respectively, of the crystal are canceled. This occurs at the time intervals when no red light waves are emanating from the object 38.

When, however, red light waves varying in intensity and originating at the object 38 further activate the photoconductor, i.e., in addition to battery 24, such light waves effective via the photoconductor and dielectric mirror at the Z axis of the KDP crystal vary the birefringence along the Z axis of the crystal. As a consequence, the blue light waves in circular polarized form at the angle slightly less than normal incidence as reflected from the dielectric mirror at the KDP crystal back surface 19 are varied in phase shift to less than 180° in amounts corresponding to the red light intensity variations.

These phase shift variations cause the transmission of corresponding varying amounts of the latter reflected blue light waves through the crystal front surface into the circular polarizer in the opposite direction as indicated by arrow 48 as previously mentioned. The reflected blue light waves varying in intensity and coming from the crystal front surface 21 are transmitted in the opposite direction through the circular polarizer 46 and collimating lens 43, focused on spaced point 50, and transmitted through lens 51 onto the load member 52 in sequence in the manner and for the purpose hereinbefore explained. The blue light waves of the source 40 as varied in intensity in the photoconductor light modulator 28 in FIG. 3 and effective at the load member represent thereat the red light waves of varying intensity originating at the object 28. It is thus seen that the intensity variations of the red light waves modulate the reflectivity of the light modulator 28, whereby intensity variations corresponding to the intensity variations of the red light waves are introduced into the blue light waves. It is therefore obvious that the color of the light waves originating in the source 40 and modulated in intensity by the modulator 10 or 28 is independent of the color of the light waves emanating from the object 28.

The transmission of reflected phase shifted circular polarized light waves through the circular polarizer in the opposite direction as indicated by the arrow 48 in FIG. 3 may be written:

$$I = I_0 \sin^2 \zeta/2, \text{ or} \quad (1)$$

$$I = I_o \sin^2 kV \quad (2)$$

where $I$ is the transmission intensity, $I_o$ is the incident intensity, $\zeta$ is the induced phase shift, $V$ is the voltage drop across the crystal in the modulator, and $k$ is a constant peculiar to the material of the crystal.

Once the modulator 28 is charged by the battery 24 and the light waves originating in the object 38, it remains charged for a period of time dependent upon the RC time constant of the crystal. For the KDP crystal 18, the time constant is of the order of 1/30th second. In a fast system the time constant would be the framing rate.

The embodiment of the invention utilizing the photoconductor light modulator 10 of FIG. 1 in the system of FIG. 3 operates substantially in the manner above described for the embodiment consisting of FIGS. 2 and 3. It is understood that a crystal of ammonium dihydrogen phosphate substituted for the KDP crystal in FIGS. 1, 2 and 3 provides equally satisfactory results.

It is thus apparent that the invention is expeditiously adaptable to translate one color light waves into other color light waves, to translate a chromatic image into an achromatic image, to translate an achromatic image into a chromatic image, and to separate each color from a multicolor image.

It is understood that the invention herein is described in specific respects for the purpose of this description. It is also understood that such respects are merely illustrative of the application of the invention. Numerous other arrangements may be devised by those skilled in the art without departing from the spirit and scope of the invention.

I claim:

1. A color light wave translation apparatus, comprising:
- a source of light waves of a first preselected color and of a variable intensity;
- a supply of light waves of a second preselected color and of a fixed intensity;
- a light wave modulator for translating said first preselected color light waves of variable intensity into said second preselected color light waves of corresponding variable intensity, including:
- a crystal consisting of predetermined chemical components and formed with front and back surfaces;
- a first electric electrode transparent to said second preselected color light waves and mounted on said crystal front surface;
- a dielectric mirror reflective to said second preselected color light waves and attached to said crystal back surface;
- a photoconductor means secured to said dielectric mirror;
- a second electric electrode transparent to said first preselected color light waves and joined to said photoconductor means;
- and electric energizing means connected to said first and second electric electrodes;
- means for reflecting said second preselected color light waves in a predetermined direction;
- birefringent collimating lens means receiving in one direction said second preselected color light waves at an angle slightly less than normal incidence as said latter waves are reflected in said predetermined direction;
- birefringent circular polarizer means for applying through said first electrode to said crystal front surface said second preselected color light waves in circular polarized form at said angle slightly less than normal incidence as received from said collimating lens means in said one direction;
- whereby said photoconductor means initially activated by said energizing means drives said crystal back surface for shifting through 180° the phase of said second preselected color light waves transmitted through said first electrode and said crystal front surface and reflected by said dielectric mirror in a direction opposite to said one direction to block the transmission of said last-mentioned reflected waves through said crystal front surface; said photoconductor means further activated through said second electrode by said first preselected color light waves of varying intensity to additionally drive said crystal back surface for shifting the phase of said last-mentioned reflected light waves in an amount less than 180° in correspondence with said varying intensity of said first color light waves to transmit said last-mentioned reflected light waves through said crystal front surface in said opposite direction in an intensity varying in correspondence with the varying intensity of said first preselected color light waves;
- said birefringent circular polarizer means receiving in said opposite direction from said crystal front surface said reflected second preselected color light waves in said circular polarized form at said angle slightly less than normal incidence for removing said circular polarized form from said last-mentioned waves;
- said birefringent collimating lens means receiving in said opposite direction said last-mentioned waves free from said circular energized form and focusing said last-mentioned waves onto a point spaced from said first-mentioned second preselected color light wave-reflecting means;
- further lens means coupled through said spaced point to said collimating lens means for receiving therefrom said second preselected second color light waves of varying intensity as transmitted in said opposite direction through said crystal front surface;
- and load means utilizing said second preselected color light waves of varying intensity as received from said further lens means as representative of said first preselected color light waves of varying intensity.